(12) United States Patent
Kim

(10) Patent No.: US 12,478,150 B2
(45) Date of Patent: Nov. 25, 2025

(54) ORNAMENT COUPLING APPARATUS AND METHOD AND ORNAMENT

(71) Applicant: Hong Kwan Kim, Seoul (KR)

(72) Inventor: Hong Kwan Kim, Seoul (KR)

( * ) Notice: Subject to any disclaimer, the term of this patent is extended or adjusted under 35 U.S.C. 154(b) by 664 days.

(21) Appl. No.: 16/561,609

(22) Filed: Sep. 5, 2019

(65) Prior Publication Data

US 2021/0045504 A1     Feb. 18, 2021

(30) Foreign Application Priority Data

Aug. 13, 2019   (KR) ........................ 10-2019-0098922

(51) Int. Cl.
| | | |
|---|---|---|
| *B23P 19/04* | (2006.01) | |
| *A41D 27/08* | (2006.01) | |
| *A44B 13/00* | (2006.01) | |
| *A44C 15/00* | (2006.01) | |
| *B23P 19/02* | (2006.01) | |
| *B23P 19/10* | (2006.01) | |
| *B25B 27/02* | (2006.01) | |
| *B25B 27/14* | (2006.01) | |
| *B26F 1/40* | (2006.01) | |
| *G09F 7/16* | (2006.01) | |
| *G09F 7/18* | (2006.01) | |

(52) U.S. Cl.
CPC .......... *A44C 15/0035* (2013.01); *A41D 27/08* (2013.01); *A44B 13/0029* (2013.01); *A44B 13/0041* (2013.01); *B23P 19/02* (2013.01); *B23P 19/04* (2013.01); *B23P 19/10* (2013.01); *B25B 27/02* (2013.01); *B25B 27/14* (2013.01); *B26F 1/40* (2013.01); *G09F 7/16* (2013.01); *G09F 2007/1882* (2013.01)

(58) Field of Classification Search
CPC ........ B21D 28/02; B21D 28/10; B21D 28/14; B21D 28/26; B21D 28/34; B23P 19/02; B23P 19/10; B26F 1/40; B26F 1/405; B26F 3/002
See application file for complete search history.

(56) References Cited

U.S. PATENT DOCUMENTS

| | | | | |
|---|---|---|---|---|
| 2009/0040002 A1* | 2/2009 | Kim | ...................... | B21D 28/02 29/609 |
| 2018/0085864 A1* | 3/2018 | Wilhelm | ................ | B21D 43/02 |
| 2018/0229335 A1* | 8/2018 | Toffanello | ................. | B30B 9/00 |

FOREIGN PATENT DOCUMENTS

| | | |
|---|---|---|
| CN | 102397945 A | 4/2012 |
| CN | 104337065 A | 2/2015 |

(Continued)

OTHER PUBLICATIONS

Machine Translation of CN 206912017 U (Year: 2018).*

*Primary Examiner* — Christopher J. Besler
(74) *Attorney, Agent, or Firm* — STIP Law Group, LLC

(57) ABSTRACT

Disclosed is an ornament including male-shaped ornaments which are attached to one surface of a desired portion, respectively; and a unit plate to fix the respective male-shaped ornaments to the other surface of the desired portion, so that the desired portion is freely flexible. A side of the male-shaped ornament is provided with a fitting protrusion which passes through the desired portion to fix the male-shaped ornament to the unit plate, and the unit plate is provided with an engaging hole into which the fitting protrusion is fitted. Also, disclosed are an ornament coupling apparatus and method for the ornament.

5 Claims, 8 Drawing Sheets

(56) References Cited

FOREIGN PATENT DOCUMENTS

| | | | | |
|---|---|---|---|---|
| CN | 106355993 | A | 1/2017 | |
| CN | 206271322 | U | 6/2017 | |
| CN | 106935133 | A | 7/2017 | |
| CN | 206912017 | U * | 1/2018 | |
| CN | 109433922 | A | 3/2019 | |
| CN | 210148289 | U | 3/2020 | |
| JP | 2012216794 | A * | 11/2012 | ....... H01L 29/66969 |
| KR | 20080053999 | A | 6/2008 | |
| KR | 100946769 | B1 | 4/2010 | |
| KR | 20130035710 | A | 4/2013 | |
| KR | 101357229 | B1 | 2/2014 | |
| KR | 20150022546 | A | 3/2015 | |
| KR | 101583359 | B1 | 1/2016 | |
| KR | 101723208 | B1 | 4/2017 | |

* cited by examiner

ORNAMENT COUPLING APPARATUS AND METHOD AND ORNAMENT

CROSS REFERENCE TO RELATED APPLICATION

The present application claims the benefit of Korean Patent Application No. 10-2019-0098922 filed in the Korean Intellectual Property Office on Aug. 13, 2019, the entire contents of which are incorporated herein by reference.

BACKGROUND OF THE INVENTION

Field of the Invention

The present invention relates to an ornament coupling apparatus and method and an ornament, and more particularly, to an ornament, which is attached to a product, such as a handbag, a wallet, a bag, or a hat, and is engaged to a separate unit plate, so that a detached portion of the product is easily flexible, and an ornament coupling apparatus and method for the same.

Background of the Related Art

In general, ornaments of various shapes, which represent trademarks, logos, or emblems, as well as developing high-class ornament effects and aesthetic senses are attached to surfaces of various fashion accessories, such as handbag, a wallet, a bag, a belt, or a hat, shoes, and clothing to increase merchantable quality of the product. Otherwise, ornaments are used to connect any members, such as straps for luggage and bags, strap rings, or handles.

The ornament could be attached to a product by a method using an adhesive or a method of perforating the product and fastening male and female ornaments through a hole. The adhesive method has a drawback of insufficient adhesive strength, and the fastening method has a drawback in that since an interference fit is employed or an engaging protrusion is fitted into an engaging groove, the ornament is separated from the product by mere impact or strong pulling force.

As illustrated in FIGS. 1 and 2, an ornament of the related art does not satisfy a demand of a customer, since the respective male ornaments 2 is engaged to one washer plate 3 made of a metallic material, with a desired portion 1 of, for example, a leather product, such as a handbag, a wallet, a bag or a hat, being interposed therebetween, and thus the desired portion 1 is not flexible.

Patent Literatures

Korean Patent No. 10-1583359
Korean Patent No. 10-1357229

SUMMARY OF THE INVENTION

Therefore, the present invention has been made in view of the problems of the related art, and an object of the present invention is to provide an ornament, such as a trademark, a logo, or an emblem, which is attached to a product, such as a handbag or a wallet, in which since each male-shaped ornament is engaged to each unit plate, with a desired portion of the product being interposed therebetween, the desired portion of the product, to which the entire ornament is attached, is freely flexible, thereby improving efficiency of the product, regardless of a hard material, and maximizing satisfaction of a user.

Another object of the present invention relates to an apparatus and method for coupling an ornament to a desired portion of a product.

In order to achieve the above and other objects, according to the first aspect of the present invention, there is provided an ornament coupling apparatus including an upper mold which is moved down by operation of a pressing machine; a punching member which is provided on a center of a lower portion of the upper mold; a lower mold which is installed below the upper mold, and is provided with a washer plate seating portion on which a washer plate with a unit plate attached thereon is seated, in which the washer plate seating portion is provided with a punching hole through which the unit plate is dropped by operation of the punching member; a spring which is interposed between the upper mold and the lower mold to resiliently support the upper mold; and a male-shaped ornament seating member which is installed below the lower mold at a position corresponding to the washer plate seating portion, and the male-shaped ornament 20 is seated on the male-shaped ornament seating member in such a way that a fitting protrusion of the male-shaped ornament faces upwardly, and the unit plate dropped through the punching hole is engaged to the male-shaped ornament.

The ornament coupling apparatus may further include a punching member coupling plate which is installed on the lower mold to receive the punching member, thereby preventing horizontal movement of the punching member.

The punching hole may be formed in the same shape as that of the unit plate at the same position as that of the unit plate so that each unit plate attached to the washer plate is dropped by operation of the punching member and then is fixed to the male-shaped ornament.

The punching member may be formed in the same shape as that of the punching hole to separate the unit plate from the washer plate, respectively.

A lower portion of the punching member may be provided with a penetration groove, in which the fitting protrusion of the male-shaped ornament is inserted, so that the fitting protrusion is fitted into an engaging hole of the unit plat passing through the punching hole.

The unit plate may be connected to the washer plate by a plurality of dotted lines so that the unit plate is separated from the washer plate by downward movement of the punching member.

According to another aspect of the present invention, there is provided an ornament coupling method including the steps of: placing a washer plate attached with a unit plate along a dotted line on a washer plate seating portion which is formed on an upper portion of a lower mold; placing a male-shaped ornament on a male-shaped ornament seating member which is provided below the lower mold in such a way that a fitting protrusion of the male-shaped ornament is facing upwardly; interposing a desired portion between the lower mold and the male-shaped ornament seating member; lowering an upper mold provided on the lower mold to separate the unit plate from the washer plate by a punching member, respectively; and after the upper mold is moved down and then the lower mold is moved down, penetrating the fitting protrusion of the male-shaped ornament the desired portion, and separating the unit plate from the washer plate by operation of the upper mold and the punching member, so that the washer plate is dropped through a punching hole of the lower mold, and the fitting protrusion is fitted into an engaging hole of the unit plate, thereby engaging the male-shaped ornament and the unit plate, with the desired portion being interposed therebetween.

At step of engaging the male-shaped ornament and the unit plate by operation of the punching member, with the desired portion being interposed therebetween, when the punching member for engaging the unit plate to the male-shaped ornament is moved down, the fitting protrusion fitted in the engaging hole of the unit plate penetrates the desired portion, and then is inserted in a penetration groove of the punching member.

At step of engaging the male-shaped ornament and the unit plate by operation of the punching member, with the desired portion being interposed therebetween, since the punching holes, through which each unit plate passes, are aligned on the washer plate seating portion, on which the washer plate is placed, all of the male-shaped ornaments is uniformly arranged and engaged to the respective unit plates, without being out of line with the respective unit plates.

According to the other aspect of the present invention, there is provided an ornament including: male-shaped ornaments which are attached to one surface of a desired portion of a product, such as a handbag, a wallet or a bag, respectively; and a unit plate to fix the respective male-shaped ornaments to the other surface of the desired portion, so that the desired portion is freely flexible.

A side of the male-shaped ornament may be provided with a fitting protrusion which passes through the desired portion to fix the male-shaped ornament to the unit plate, and the unit plate may be provided with an engaging hole into which the fitting protrusion is fitted.

The fitting protrusion and the engaging hole may be provided in plural to prevent free movement of the male-shaped ornament and the unit plate when the male-shaped ornament is fixed the unit plate.

With the above configuration, the ornament, such as a trademark, a logo, or an emblem, which is attached to the product, such as a handbag or a wallet, in which since each male-shaped ornament is engaged to each unit plate, with the desired portion of the product being interposed therebetween, the desired portion of the product, to which the entire ornament is attached, is freely flexible, thereby improving efficiency of the product, regardless of a hard material, and maximizing satisfaction of a user.

DETAILED DESCRIPTION OF THE PREFERRED EMBODIMENT

Figure 1:
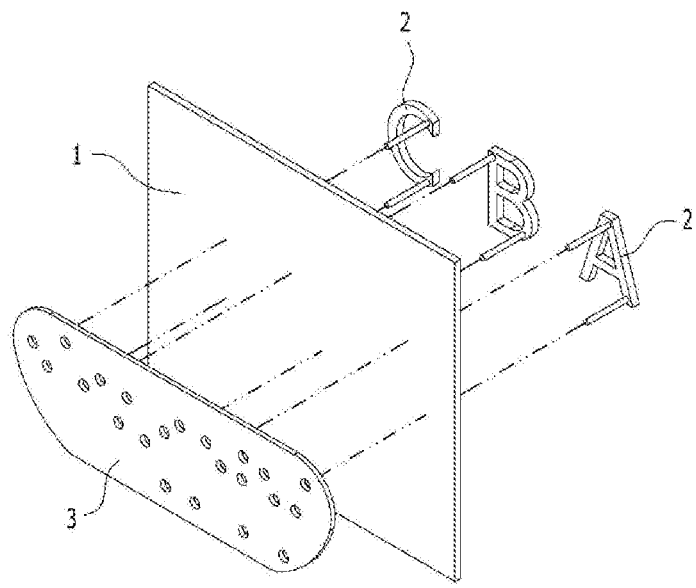
FIG. 1 is an exploded perspective view illustrating a disengaged state of an ornament according to the related art.
Figure 2:
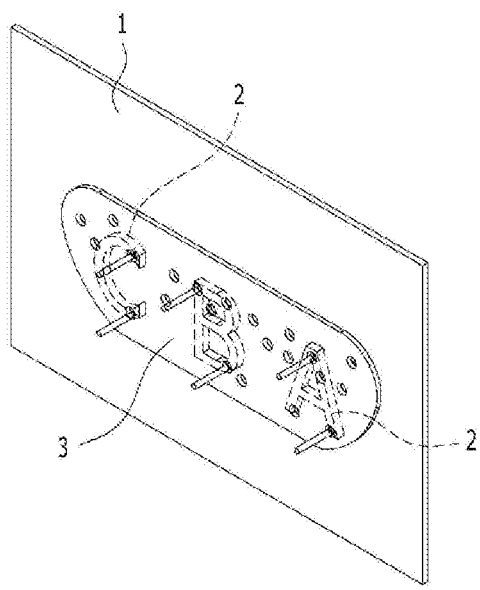
FIG. 2 is a perspective view illustrating an engaged state of an ornament according to the related art.

Now, preferred embodiments of the present invention will be described in detail with reference to the accompanying drawings.

In the following description, the terminology used herein is for the purpose of describing particular embodiments only and is not intended to limit the right scope of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning.

Detailed descriptions of well-known functions or constructions will be omitted since they would obscure the invention in unnecessary detail.

The accompanying drawings are used to help easily understand the technical idea of the present invention, and it should be understood that the idea of the present invention is not limited by the accompanying drawings.

Also, the term "and/or" covers embodiments having element A alone, element B alone, or elements A and B taken together. As used herein, the singular forms "a," "an" and "the" are intended to include the plural forms as well, unless the context clearly indicates otherwise. In the present application, such terminology as 'configured', 'include' and the like should be construed not as necessarily including various components or steps written in the present specification but as including the components or steps in part or further including additional components or steps.

Incidentally, it is assumed that front, rear, left, right, upward, and downward viewing directions are expediently used to distinguish the relative position of the respective components. For example, the upper direction of the drawing will be referred to an upper portion, a longitudinal direction will be referred to back and forth directions, and a width direction will be referred to left and right directions.

Figure 3:
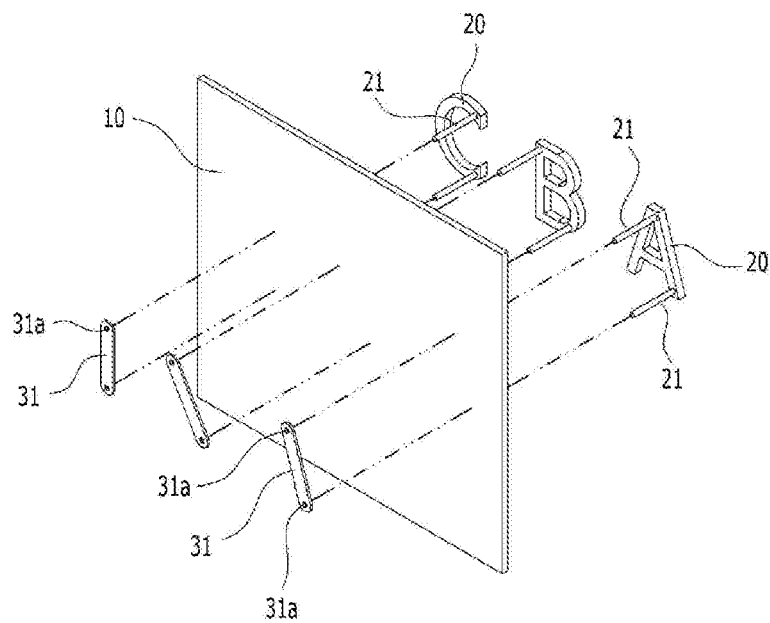
FIG. 3 is an exploded perspective view illustrating a disengaged state of an ornament according to one embodiment of the present invention.
Figure 4:
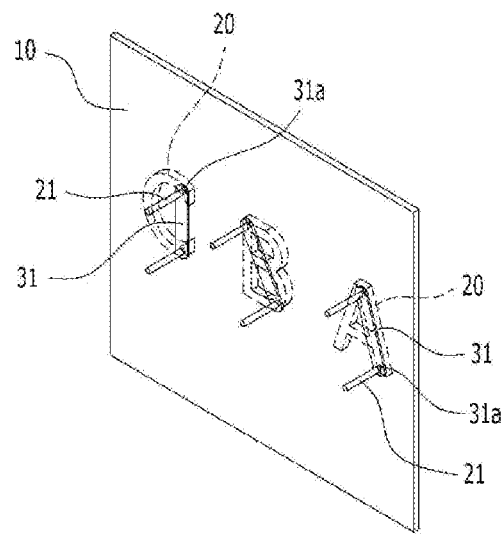
FIG. 4 is a perspective view illustrating an engaged state of the ornament according to one embodiment of the present invention.
Figure 5:
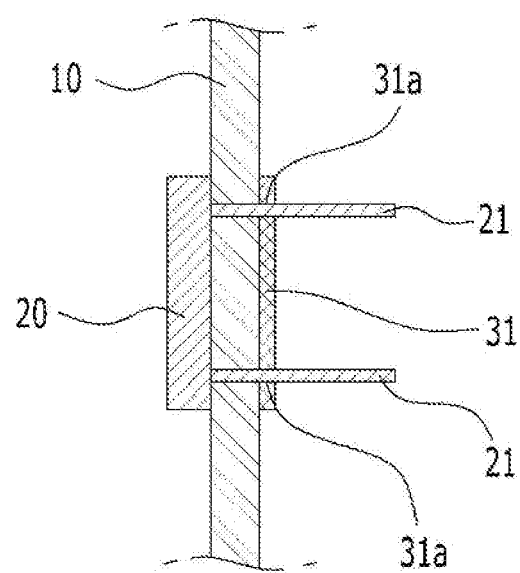
FIG. 5 is a cross-sectional view illustrating the engaged state of the ornament according to one embodiment of the present invention.
Figure 6:
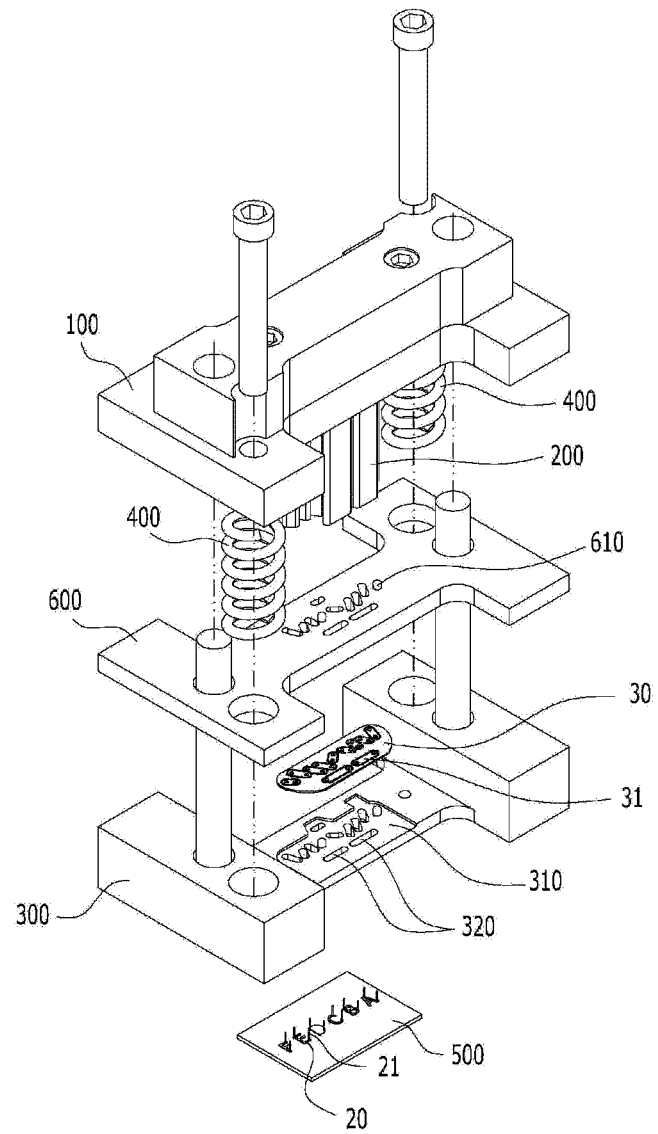
FIG. 6 is an exploded perspective view illustrating an engaged state of an ornament coupling device according to one embodiment of the present invention.
Figure 7:
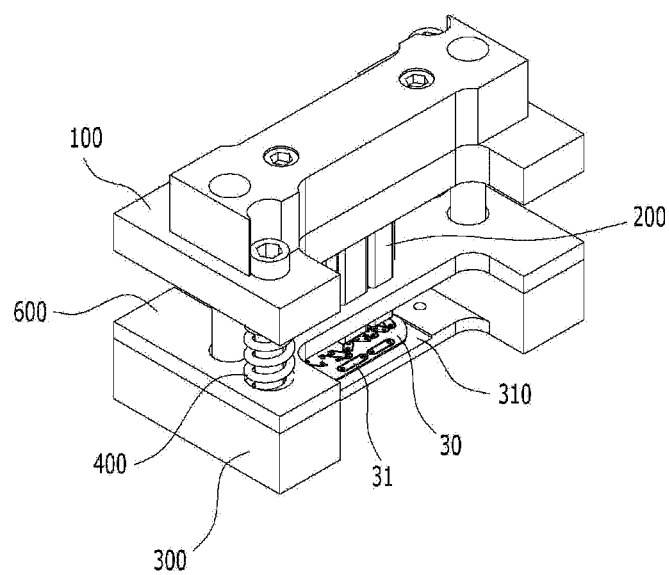
FIG. 7 is a perspective view illustrating the ornament coupling device according to one embodiment of the present invention.
Figure 8:
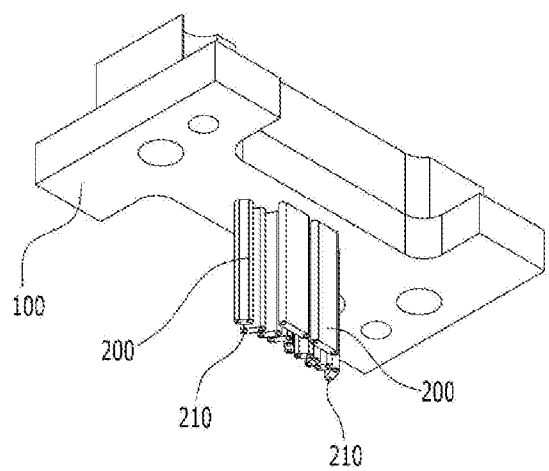
FIG. 8 is a perspective view illustrating an upper mold of the ornament coupling device according to one embodiment of the present invention, when seen from a bottom, the upper mold having a punching member.

FIG. 3 is an exploded perspective view illustrating a disengaged state of an ornament according to one embodiment of the present invention. FIG. 4 is a perspective view illustrating an engaged state of the ornament according to one embodiment of the present invention. FIG. 5 is a cross-sectional view illustrating the engaged state of the ornament according to one embodiment of the present invention. FIG. 6 is an exploded perspective view illustrating an engaged state of an ornament coupling device according to one embodiment of the present invention. FIG. 7 is a perspective view illustrating the ornament coupling device according to one embodiment of the present invention. FIG.

Figure 9:
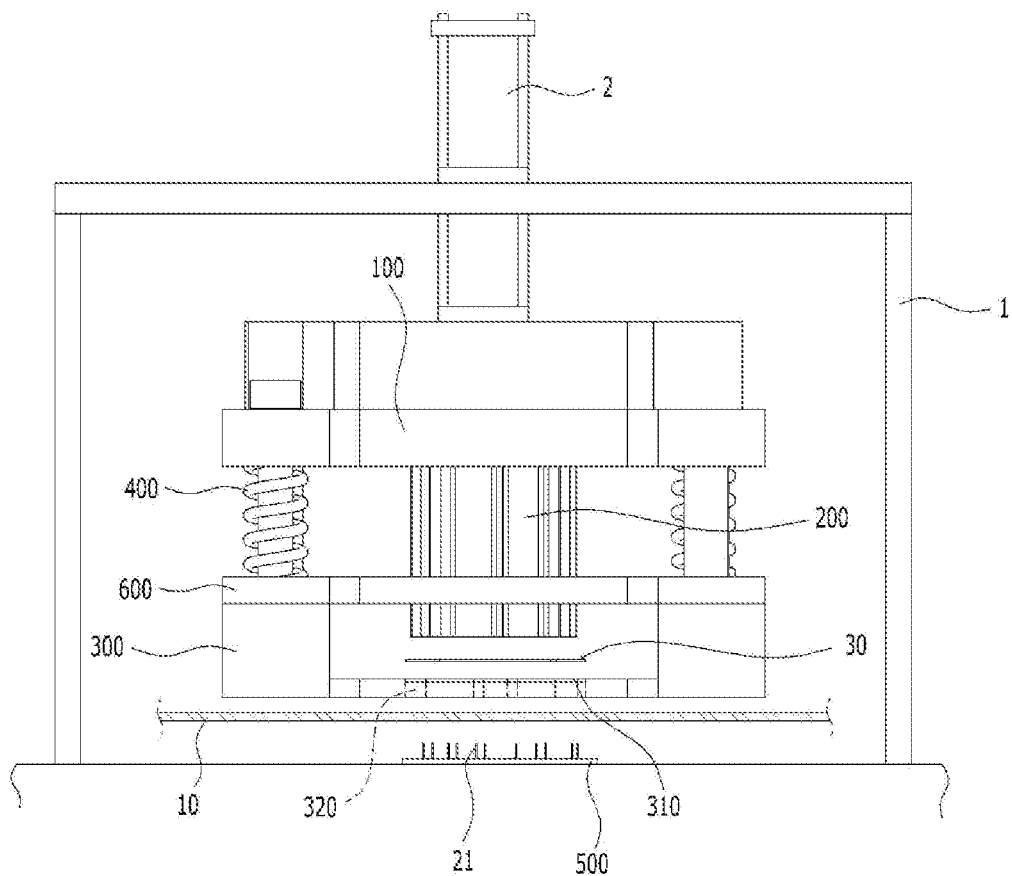
FIG. 9 is a front view illustrating the ornament coupling device according to one embodiment of the present invention.
Figure 10:
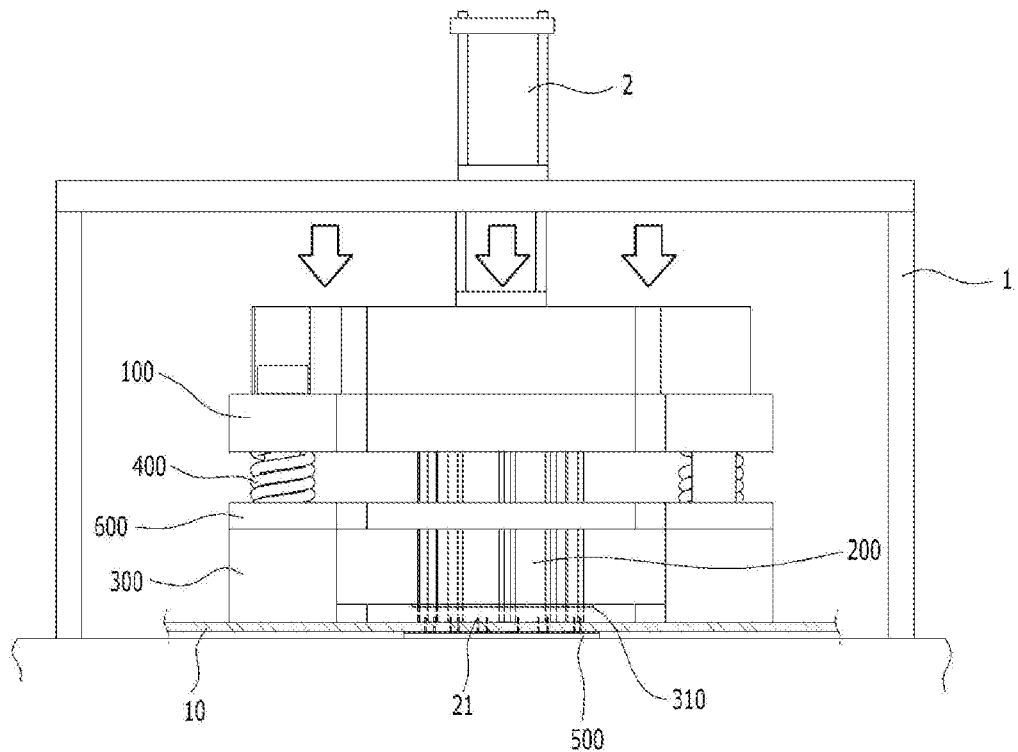
FIG. 10 is a front view illustrating an operating state of the ornament coupling device according to one embodiment of the present invention.
Figure 11:
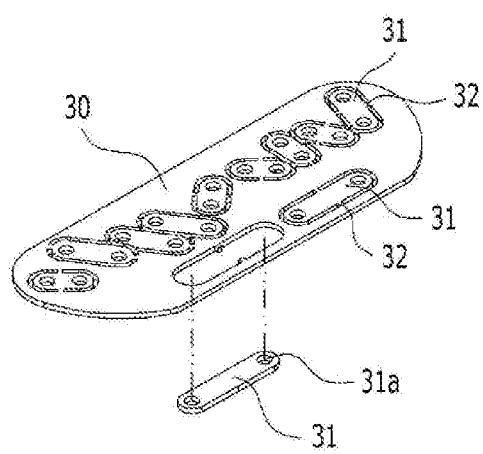
FIG. 11 is a perspective view illustrating a washer plate of the ornament coupling device according to one embodiment of the present invention.
Figure 12:
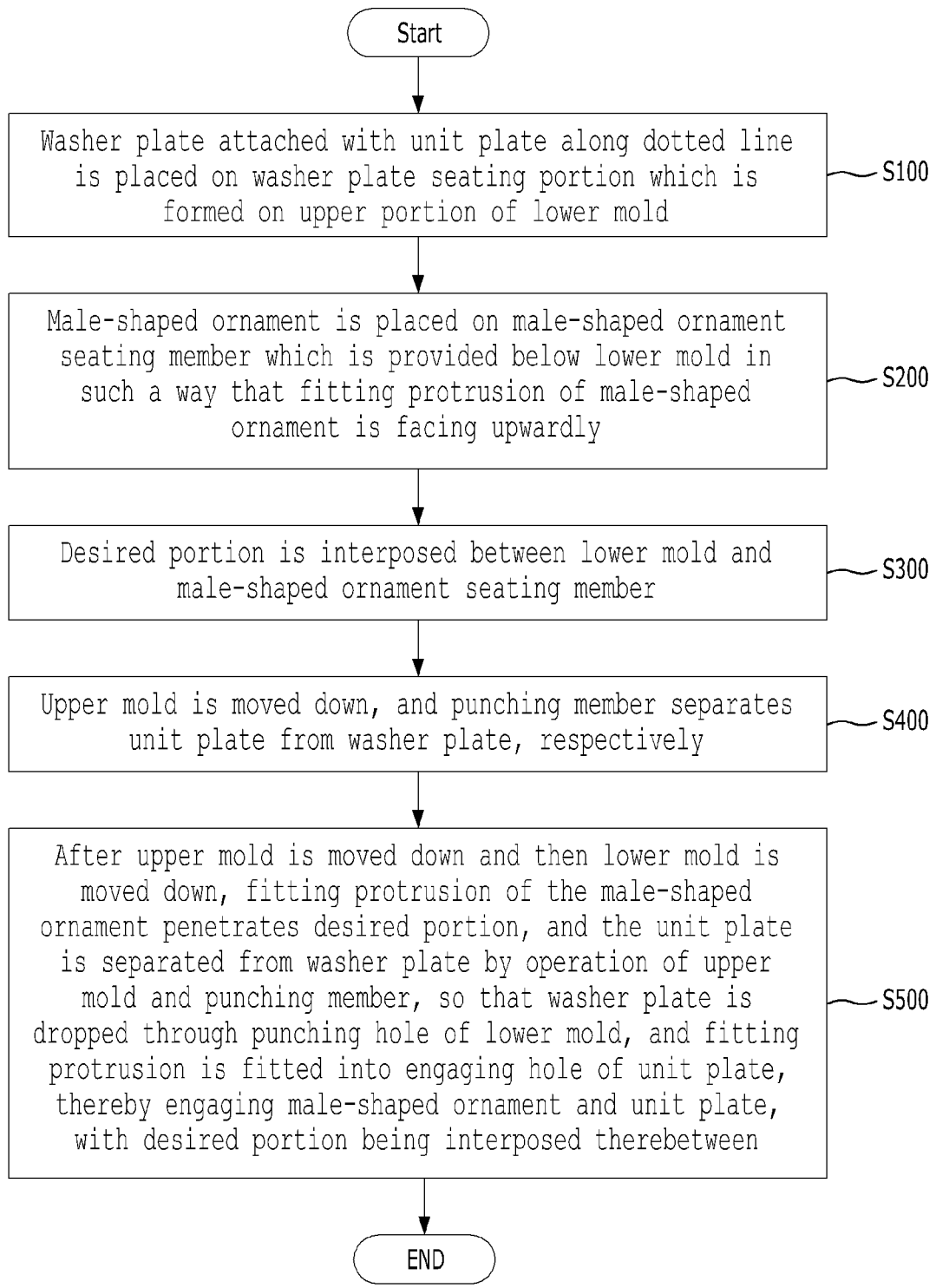
FIG. 12 is a flow chart illustrating an ornament coupling method according to one embodiment of the present invention.

8 is a perspective view illustrating an upper mold of the ornament coupling device according to one embodiment of the present invention, when seen from a bottom, the upper mold having a punching member. FIG. 9 is a front view illustrating the ornament coupling device according to one embodiment of the present invention. FIG. 10 is a front view illustrating an operating state of the ornament coupling device according to one embodiment of the present invention. FIG. 11 is a perspective view illustrating a washer plate of the ornament coupling device according to one embodiment of the present invention. FIG. 12 is a flow chart illustrating an ornament coupling method according to one embodiment of the present invention.

Embodiment 1

As illustrated in FIGS. 6 to 11, an ornament coupling apparatus for coupling an ornament, such as a trademark, a logo, or an emblem, which is attached to a product, such as a handbag or a wallet, according to the present invention includes an upper mold 100, punching members 200, a lower mold 300, a spring 400, a male-shaped ornament seating member 500, a punching member connecting plate 600.

The upper mold 100 is connected to a cylinder 2 which is installed to an upper portion of a frame 1, and is moved down by operation of the cylinder 2.

The punching members 200 are installed to the center of a lower portion of the upper mold 100, and are moved down by downward movement of the upper mold 100 to separate a unit plate 31 from a washer plate 30.

The punching member 200 has the same shape as that of the unit plate 31 in order to individually separate the respective unit plates 31 from the washer plate 30.

The lower portion of the punching member 200 is provided with penetration grooves 210 so that when each unit plate 31 is separated from each washer plate 30, a fitting protrusion 21 of the male-shaped ornament 20 is fitted into an engaging hole 31a of the unit plate 31.

The number of penetration grooves 210 is preferably equal to or more than the number of the fitting protrusions 21 formed on the respective male-shaped ornaments 20.

The lower mold 300 is installed below the upper mold 100, and is provided with a washer plate seating portion 310 on which the washer plate 30 with the unit plate 31 attached thereon is seated.

Specifically, the lower mold 300 is moved down together with the upper mold which is moved down by operation of the cylinder 2, and then the fitting protrusion 21 of the male-shaped ornament 20 penetrates a desired portion 10.

The washer plate seating portion 310 is provided with punching holes 320 to fix the male-shaped ornament 20 to the desired portion 10 when the unit plate 31 attached to the washer plate 30 is dropped by the downward movement of the punching member 200.

The number of punching holes 320 is preferably equal to or more than the number of the unit plates 31 attached to the washer plate 30.

The punching holes 320 have the same shape as that of the corresponding unit plate 31, and are formed at the same position as that of the corresponding unit plate 31, so that each unit plate 31 attached to the washer plate 30 is dropped by the operation of the punching member 200 and then is fixed to the male-shaped ornament 20.

Specifically, the washer plate seating portion 310 is formed to have the same shape as that of the washer plate 30, and each punching hole 320 is formed to have the same shape as that of the corresponding unit plate 31, and is formed at the same position as that of the corresponding unit plate 31, so that according to the downward movement of the punching member 200, each unit plate 31 attached to the washer plate 30 is separated from the washer plate 30, and then is dropped through the punching hole 320.

The number and shape of punching holes 320 are identical to those of the male-shaped ornaments 20 to be attached to the desired portion 10.

The washer plate 30 is attached with the unit plate 31 to fix the male-shaped ornament 20 to the desired portion 10, and a plurality of dotted lines 32 are formed along a boundary between the unit plate 31 and the washer plate 30 so that the unit plate 31 can be easily detached from the washer plate 30 by the downward movement of the punching member 200.

Specifically, since the dotted lines 32 are formed along the boundary between the unit plate 31 and the washer plate 30, the unit plate 31 can be easily detached from the washer plate 30 by the downward movement of the punching member 200, without being damaged.

The springs 400 are interposed between the upper mold 100 and the lower mold 300 to resiliently support the upper mold 100.

The male-shaped ornament seating member 500 is installed below the lower mold 300 at a position corresponding to the washer plate seating portion 310, and the male-shaped ornament 20 is seated on the male-shaped ornament seating member.

When the male-shaped ornament 20 is placed on the male-shaped ornament seating member 500, the fitting protrusion 21 of the male-shaped ornament 20 is facing upwardly. Accordingly, the fitting protrusion 21 of the male-shaped ornament 20 penetrating the desired portion 10 is fitted into the engaging hole 31a of the unit plate 31 which is dropped through the punching hole 320, thereby fixing the male-shaped ornament 20 and the unit plate 31 to the desired portion 10.

The punching member coupling plate 600 is installed on the lower mold 300 to receive the punching member 200, and is configured to prevent free movement of the punching member 200 which is moved down according to the downward movement of the upper mold 100.

The punching member coupling plate 600 is provided with coupling holes 610 so that the punching members 200 move up and down through the holes 610.

The coupling holes 610 are formed to have the same number and shape as those of the punching members 20 to receive all punching members.

In this instance, the number of coupling holes 610 may be equal to or more than the number of the punching members 200.

Embodiment 2

As illustrated in FIGS. 6 to 12, in a method for coupling the ornament, such as a trademark, a logo, or an emblem, which is attached to a product, such as a handbag or a wallet, according to the present invention, the washer plate 20 attached with the unit plate 31 along the dotted line 32 is placed on the washer plate seating portion 310 which is formed on an upper portion of the lower mold 300 (step S100).

When the washer plate 20 is placed on the washer plate seating portion 310, the unit plate 31 should be exactly placed on an upper portion of a punching hole 320.

The male-shaped ornament 20 is placed on the male-shaped ornament seating member 500 provided below the lower mold 300 in such a way that the fitting protrusion 21 of the male-shaped ornament 20 is facing upwardly (step S200).

Specifically, if the fitting protrusion 21 of the male-shaped ornament 20 which is placed on the male-shaped ornament seating member 500 is facing upwardly, the fitting protrusion 21 is fitted into an engaging hole 31a of the unit plate 31 to be dropped.

The desired portion 10, to which the male-shaped ornament 20 is attached, is interposed between the lower mold 300 and the male-shaped ornament seating member 500 (step S300).

After the washer plate 30 is placed on the male-shaped ornament seating member 500, and the male-shaped ornament 20 is placed on the male-shaped ornament seating member 500, the desired portion 10 is positioned on the male-shaped ornament seating member 500. After that, the upper mold 100 is moved down by operation of the cylinder 2, and then the punching member 200 individually separates the unit plate 31 which is connected to the washer plate 30 by the dotted line 32 in a dot-contact manner, from the washer plate 30 (step S400).

Specifically, since the proper number of punching members 200 is provided according to the number of the unit plates 31, and each unit plate 31 is connected to the washer plate 30 by the dotted line 32 in the dot-contact manner, each punching member 200 can easily separate each unit plate 31, respectively.

By the downward movement of the lower mold 300 followed by the downward movement of the upper mold 100, the fitting protrusion 21 of the male-shaped ornament 20 seated on the male-shaped ornament seating member 500 penetrates the desired portion 10. Each unit plate 31 attached to the washer plate 30 is separated from the washer plate by operation of the upper mold 100 and the punching member 200, and then is dropped through the punching hole 320. Then, the fitting protrusion 21 is fitted into the engaging hole 31a of the unit plate 31, so that the male-shaped ornament 20 and the unit plate 31 are engaged to each other, with the desired portion 10 being interposed therebetween (step S500).

At the step S500 in which the male-shaped ornament 20 and the unit plate 31 are engaged to each other by the operation of the punching member 200, with the desired portion 10 being interposed therebetween, when the punching member 200 for engaging the unit plate 31 to the male-shaped ornament 20 is moved down, the fitting protrusion 21 penetrating the desired portion 10 is fitted into the engaging hole 31a of the unit plate 31, and then is inserted in the penetration groove 210 of the punching member 200.

Specifically, the unit plate 31 is separated from the washer plate 30 by the downward movement of the punching member 200, and then is dropped through the punching hole 320. When the unit plate 31 is engaged to the male-shaped ornament 20, the fitting protrusion 21 is fitted in to the penetration groove 210 through the engaging groove 31a, so that the male-shaped ornament 20 and the unit plate 31 are easily engaged to each other, with the desired portion 10 being interposed therebetween.

Also, at the step S500 in which the male-shaped ornament 20 and the unit plate 31 are engaged to each other by the operation of the punching member 200, with the desired portion 10 being interposed therebetween, since the punching holes 320, through which the unit plates 31 pass, are aligned on the washer plate seating portion 310, on which the washer plate 30 is placed, all male-shaped ornaments 20 attached to the desired portion 10 can be uniformly arranged and engaged to the respective unit plates 31, without being out of line with the respective unit plates.

Embodiment 3

As illustrated in FIGS. 3 to 5, the ornament to be attached to a product, such as a handbag, a wallet or a bag, according to the present invention includes the male-shaped ornament 20 and the unit plates 31.

The male-shaped ornament 20 is attached to one surface of the desired portion 10 of the product, such as a handbag, a wallet or a bag.

The male-shaped ornament 20 can be individually attached to the desired portion 10.

The male-shaped ornament 20 represents a trademark, a logo, or an emblem of the handbag, the wallet or the bag.

Specifically, although the male-shaped ornament 20 is shown in the alphabetic shape of A, B and C in the drawings, but the present invention is not limited thereto. The ornament may include some letters suitable for a trademark or logo of the product of interest, and may be formed in any size and shape.

For example, in the case where the ornament represents Korea, the whole letter is not made of one body, but the letter is separated by individual alphabets which are attached to the desired portion, respectively.

The male-shaped ornament 20 is made of stainless steel.

Also, when the plurality of male-shaped ornaments 20 are attached to the desired portion 10, the male-shaped ornaments 20 may be uniformly attached to the desired portion in an aligned state.

The side of the male-shaped ornament 20 is provided with the fitting protrusion 21 which penetrates the desired portion 10 to fix the male-shaped ornament 20 to the unit plate 31.

The fitting protrusion 21 may be provided in plural to prevent the free movement of the male-shaped ornament 20 when the male-shaped ornament 20 is fixed to the unit plate 31.

In this instance, the desired portion 10 may be made of artificial leather or natural leather.

The unit plate 31 is attached to the other surface of the desired portion 10, to which the male-shaped ornament 20 is attached, thereby fixing the male-shaped ornament 20.

The plurality of unit plates 31 are attached to the washer plate 30 to attach the respective male-shaped ornaments 20 to the desired portion 10, and the unit plates 31 are connected to the washer plate 30 by the dotted line 32 in the dot contact manner so that the unit plate 31 can be easily separated from the washer plate 30.

The unit plate 31 fixes the respective male-shaped ornaments 20 to be attached to the desired portion 10, respectively.

The unit plate 31 is provided with the engaging hole 31a to receive the fitting protrusion 21 of the male-shaped ornament 20 and thus fix the male-shaped ornament 20 to the desired portion 10.

The engaging hole 31a may be provided in plural so that the respective fitting protrusions 21 is fitted to the engaging hole, respectively.

The engaging hole 31a may be formed in any shape, for example, a cross, a circle, a rectangle or the like.

The ornament and the apparatus and method for coupling the ornament according to the present invention will be operated.

The washer plate seating portion 310 is formed on the upper portion of the lower mold 300 which is provided below the upper mold 100, and the washer plate seating portion 310 is provided with the plurality of the punching holes corresponding to the number of the unit plates 31. Each of the unit plates 31 which is connected to the respective male-shaped ornaments 20 to be attached to the desired portion 10 can be punched.

The punching members 200 are shaped to have the same number and shape as those of the punching holes. When the punching members 200 are moved down by downward movement of the upper mold 100, the unit plates 31 connected to the washer plate 30 in the dot contact manner are separated respectively from the washer plate, and then are dropped through the respective punching holes 320. The lower mold 300 is moved down together with the downward movement of the upper mold 100 to press the desired portion 10, and then the fitting protrusion 21 of the male-shaped ornament 20 penetrates the desired portion 10, so that the male-shaped ornament 20 is coupled to the desired portion 10.

Since the unit plates 31 are respectively separated from the washer plate, each unit plate 31 is engaged to the respective male-shaped ornament 20 to be connected to the desired portion 10.

Accordingly, since each male-shaped ornament 20 is connected to one unit plate 31, with the desired portion 10 being interposed therebetween, the ornament attached to the desired portion 10 is not fixed by one washer plate, but is fixed by the plurality of unit plates 31, so that the desired portion 10, to which the ornament is attached, can be freely bent.

While the present invention has been described with reference to the particular illustrative embodiments, it is not to be restricted by the embodiments but only by the appended claims. It is to be appreciated that those skilled in the art can change or modify the embodiments without departing from the scope and spirit defined by the appended claims. Of course, equivalents thereof are contained in the present invention.

What is claimed is:

1. An ornament coupling apparatus comprising:
   an upper mold which is movable down by operation of a presser;
   a punching member which is movable down by operation of the presser, wherein the punching member is located at a center of a bottom surface of the upper mold;
   a lower mold comprising a washer plate seat, wherein,
   the lower mold is located below the upper mold,
   the washer plate seat has a punching hole, and
   the washer plate seat is configured such that a washer plate having unit plates is seated on the washer plate seat and each of the unit plates being capable of being dropped by a downward movement of the punching member;
   a spring, wherein the spring is located between the upper mold and the lower mold and is positioned on an outer portion of the bottom surface of the upper mold to resiliently support the upper mold;
   a male-shaped ornament seat, wherein the male-shaped ornament seat is located below the lower mold and at a position corresponding to the washer plate seat of the lower mold, and the male-shaped ornament seat is configured such that a plurality of male-shaped ornaments is seated on the male-shaped ornament seat, each having a fitting protrusion facing upwardly, and each of the unit plates being capable of being dropped through the punching hole and becoming engaged to respective one of the male-shaped ornaments; and
   a punching member coupling plate, wherein the punching member coupling plate is located between the lower mold and the upper mold, and the punching member coupling plate has a coupling hole, wherein the coupling hole is configured to receive the punching member, thereby preventing horizontal movement of the punching member.

2. The ornament coupling apparatus according to claim 1, wherein the punching hole has the same shape as each of the unit plates and is configured such that each of the unit plates attached to the washer plate is configured to beis dropped by the downward movement of the punching member and then becomeis engaged to a respective one of the male-shaped ornaments.

3. The ornament coupling apparatus according to claim 1, wherein the punching member has the same shape as the punching hole of the washer plate seat and is configured such that each of the unit plates is configured to beis separated from the washer plate.

4. The ornament coupling apparatus according to claim 1, wherein the punching member further comprises a penetration groove formed on a bottom surface of the punching member and the penetration groove is configured such that the fitting protrusion of the male-shaped ornament is inserted into the penetration groove and the fitting protrusion is fitted into an engaging hole of each of the unit plates by passing through the punching hole.

5. The ornament coupling apparatus according to claim 1, wherein each of the unit plates is connected to the washer plate by a plurality of dotted lines such that each of the unit plates is configured to be separated from the washer plate by the downward movement of the punching member.

* * * * *